United States Patent [19]

Daley

[11] Patent Number: 4,641,601
[45] Date of Patent: Feb. 10, 1987

[54] UNDERWATER PAINTING

[75] Inventor: Edward Daley, Higherford Nr. Nelson, United Kingdom

[73] Assignee: Colebrand Limited, London, England

[21] Appl. No.: 755,614

[22] Filed: Jul. 16, 1985

[30] Foreign Application Priority Data

Jul. 17, 1984 [GB] United Kingdom ............... 8418155

[51] Int. Cl.⁴ .................. B05B 7/08; B05B 13/00; B05B 15/04
[52] U.S. Cl. ................................. 118/305; 427/421; 114/222; 114/67 R
[58] Field of Search .............. 114/222, 67 R; 118/305

[56] References Cited

U.S. PATENT DOCUMENTS 3,788,273  1/1974  Tusch et al. ................. 118/305
4,516,521  5/1985  Szelagowski .................. 118/305

FOREIGN PATENT DOCUMENTS 2442763  8/1980  France ................. 114/222

Primary Examiner—Shrive P. Beck

[57] ABSTRACT

There is shown apparatus 1 for underwater painting of a substrate 9, comprising a tubular shield 2 having a closed end 3 and an open end 4, and a paint supply device 7 and a compressed air inlet 5. The air inlet 5 passes into a chamber formed between the end 3 and a perforated baffle plate 6 which serves to provide a uniform stream of air under pressure to the open end 4 for displacing water from the substrate 9, which can then be painted using a circular ring of paint issuing from a spray tip 11 of the device 7. The position of the shield can be adjusted using adjustable casters 14, or electronically (means not shown).

9 Claims, 5 Drawing Figures

UNDERWATER PAINTING

The invention relates to underwater painting, for example of underwater structures.

According to the invention there is provided apparatus for underwater painting, comprising a tubular shield having a closed end and an open end, means for admitting gas under pressure to the interior of the shield, means internally of the shield for providing a uniform gas flow towards the open end, and a paint supply device having a paint outlet downstream of the means for providing a uniform gas flow, whereby the paint exits the open end for painting an object to be painted.

The means for providing a uniform gas flow may comprise a perforated baffle plate through which gas from the inlet may pass in use.

The perforations in the baffle plate may comprise a plurality of spaced circular arrays of perforations.

The cross-sectional area of the perforations may be less than that of the gas inlet.

The paint supply device may comprise a spray tip for providing a circular spray pattern.

The position of the spray tip may be adjustable longitudinally of the shield.

There may be means for adjustably positioning the apparatus with respect to a surface to be painted.

The positioning means may comprise a roller means which may be adjustable in position relative to the open end of the shield.

The roller means may comprise a plurality of adjustable casters.

There may be three casters.

Alternatively, the means may comprise an electronic positioning means.

According to a second aspect of the invention there is provided a method of painting an underwater structure, comprising providing a tubular shield having respective means for admitting paint and gas under pressure, positioning the shield over a substrate to be painted, passing gas under pressure into the shield and directing it to the substrate temporarily to displace water from the substrate, and passing paint through the shield onto the substrate.

Apparatus for underwater painting embodying the invention is hereinafter described, by way of example, with reference to the accompanying drawings.

Figure 1:
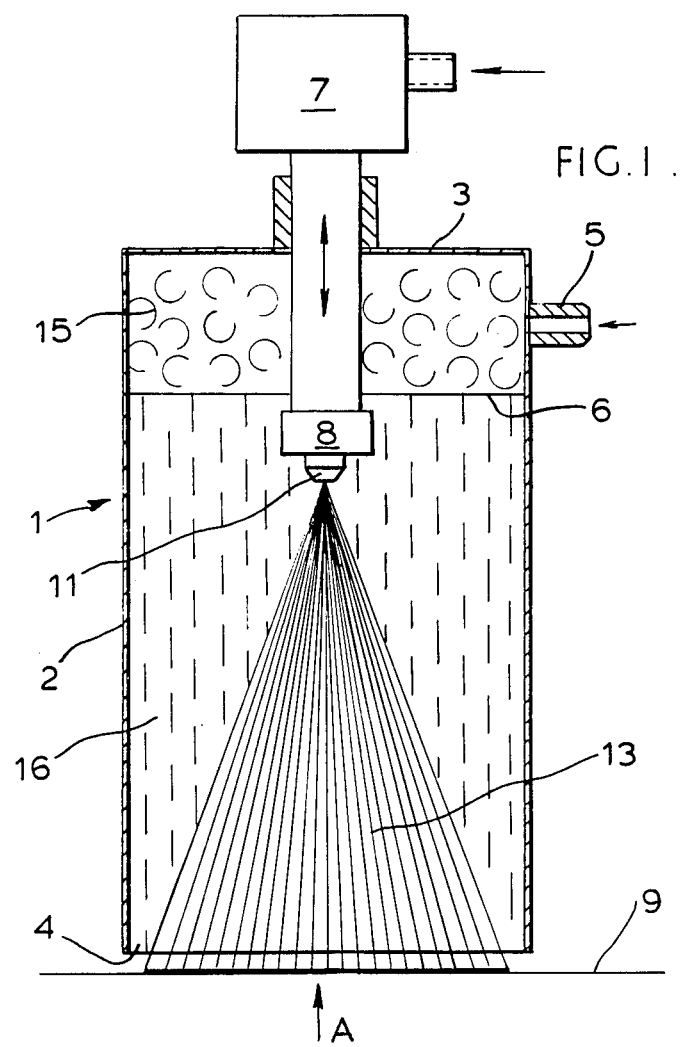
FIG. 1 is a longitudinal sectional view of the apparatus according to the invention.
Figure 2:
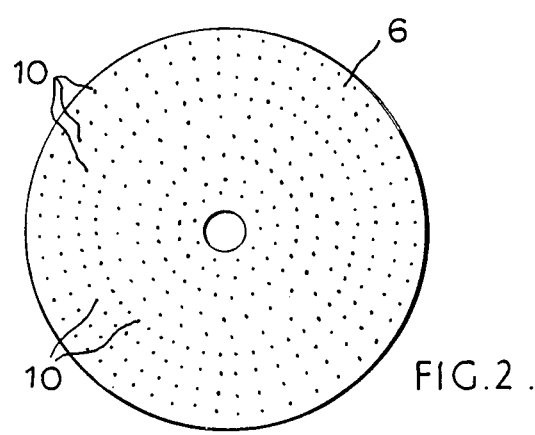
FIG. 2 is a plan view of part of the apparatus of FIG. 1.

Referring to the drawings, the apparatus 1 shown for underwater spray painting comprises a tubular shield 2 closed at one end 3 and open at the other end 4, means in the form of an inlet pipe 5 for admitting gas under pressure such as compressed air into the shield 2, means internally of the shield 2 in the form of a perforated baffle plate 6 for providing a uniform air flow towards the open end 4, and a paint supply device 7 having a paint outlet 8 downstream of the means 6 for providing a uniform air flow, whereby a spray of paint exits the open end 4 for painting an object such as an underwater substrate 9 to be painted.

The baffle plate 6 is located some 5 cm from the closed end 3, and extends right across the interior of the shield 2 at right angles to the longitudinal axis thereof. The plate 6 has a series of concentric circles of holes 10, the cross-sectional area of which is less than that of the air inlet means or pipe 5.

Figure 3:
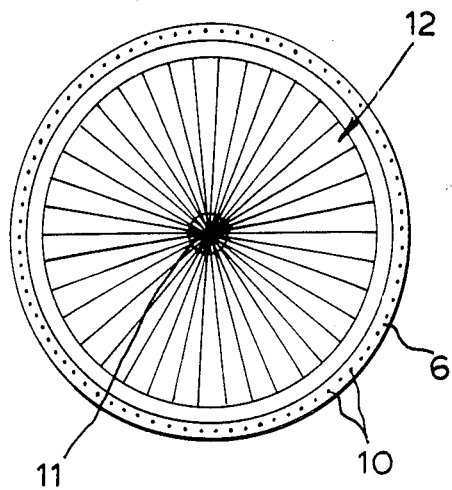
FIG. 3 is a view on arrow 'A' of FIG. 1.

The paint supply device 7 is a high pressure paint gun which protrudes from the closed end 3 through the baffle plate 6 and terminates in a spray tip 11 which produces a circular spray pattern 12 (FIG. 3), the diameter of which is governed by the distance of the tip 11 from the substrate 9. The paint travels from the spray tip 11 orifice to the substrate 9 in the form of a hollow cone 13 and therefore the diameter produced on the substrate 9 is in the form of a ring of paint (as shown in FIG. 3).

The device 7 may be adjustable, longitudinally of the shield, in relation the closed end 3.

Figure 5:
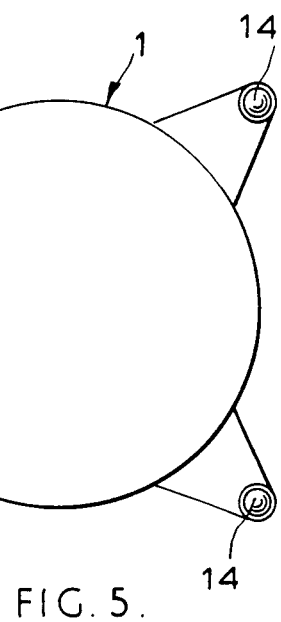
FIG. 5 is a bottom elevational view of the apparatus of FIG. 4.
Figure 4:
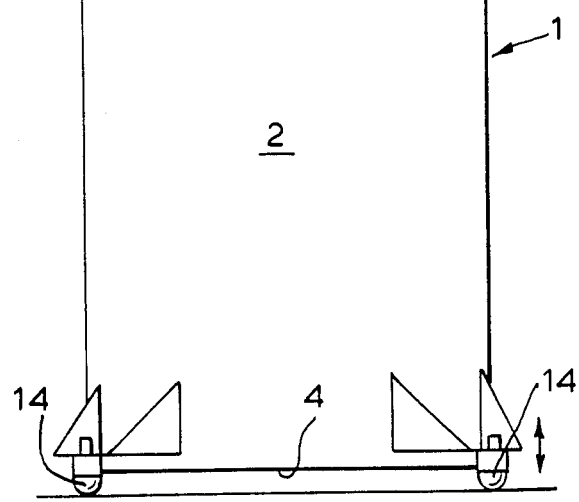
FIG. 4 is a schematic side elevational view of the apparatus of FIG. 1.

The tubular shield 2 has positioning adjustable means in the form of three adjustable casters 14 spaced apart around the periphery of the shield at the open end 4, the casters 14 protruding beyond the free end of the shield 2. The adjustability of the casters is shown by the double headed arrow in FIG. 5.

In use to spray paint an underwater structure, the spray gun 7 and air connection 5 are connected to supplies of paint and compressed air respectively. A diver manipulates the shield to a required position on a substrate 9 to be painted with the casters 14 thereon so that the shield 2 is at the correct position, the casters 14 having been adjusted for this purpose. The air supply is turned on and produces a turbulent air flow 15 between the closed end 3 and the baffle plate 6, this space thus acting like a plenum chamber. The air passes through the baffle plate 6, which regulates the turbulent air into uniform streams 16 travelling towards the open end 4 and impinging on the substrate 9. In FIG. 1 the general "C" formations in the plenum chamber represent turbulent air, the short vertical lines in shield 2 between baffle plate 6 and the open end 4 of the shield represent regulated air and the lines within the cone 13 represent pressurised paint. Because the perforations 10 on the baffle plate are of less cross-sectional area than the air inlet 5, the air in the plenum chamber 3, 6 is always at a higher pressure than that downstream of the baffle plate 6. In other words, the turbulent air 15 is at a higher pressure than the regulated air flow 16.

The air flow 16 forces water out of the shield 2 and also temporarily displaces water from the area between the outlet 4 (open end) of the shield 2 and the substrate 9.

Paint can then be sprayed from the paint tip 11 in the cone 13, to strike the substrate 9 as a ring 12 of paint. Painting proceeds by the diver manipulating the shield 2 over the substrate 9. He or she adjusts the casters 14 as necessary in relation to the particular substrate or part thereof being painted. In this case painting is carried out in a direction towards the casters in a plane at right angles to the wheels.

In an alternative embodiment, now shown, the shield may comprise part of an automatic device (to which it may be attached) and the casters may be dispensed with, the shield being positioned in relation to the substrate electronically. In this instance painting can be carried out in any direction.

I claim:

1. Apparatus for underwater painting, comprising:

(i) a tubular shield having a closed end and an open end;

(ii) means for admitting gas under pressure to the interior of the shield;

(iii) means internally of the shield for providing a uniform gas flow towards the open end; the means for providing a uniform gas flow comprising a baffle plate through which gas from the inlet passes in use and which extends across the tubular shield, the baffle plate having perforations disposed as a plurality of spaced concentric circular arrays of perforations; and (iv) a paint supply device penetrating the baffle plate and having a paint outlet downstream thereof whereby the paint exits the open end for painting an object to be painted.

2. Apparatus as defined in claim 1, wherein the cross-sectional area of the perforations is less than that of the gas inlet.

3. Apparatus as defined in claim 1, wherein the means for providing a gas inlet comprises a connector for connection with a source of compressed air.

4. Apparatus as defined in claim 1, wherein the paint supply device comprises a spray tip for providing a circular spray pattern.

5. Apparatus as defined in claim 4, wherein the position of the spray tip is adjustable longitudinally of the shield.

6. Apparatus as defined in claim 1, wherein there is means for adjustably positioning the apparatus with respect to a surface to be painted.

7. Apparatus as defined in claim 6, wherein the positioning means comprises a plurality of adjustable casters.

8. Apparatus as defined in claim 6, wherein the means comprises an electronic positioning means.

9. Apparatus for underwater painting, comprising a tubular shield having a closed end and an open end; means for admitting gas under pressure to the interior of the shield; means internally of the shield for providing a uniform gas flow towards the open end, said means for providing a uniform gas flow comprising a baffle plate arranged parallel to and spaced from the closed end of said shield across which the baffle plate extends to define a plenum chamber bounded by the closed end of the shield, said baffle plate and bounding wall portions of the shield between said closed end thereof and said baffle plate, said baffle plate having a plurality of concentric spaced circular arrays of perforations through which gas from the inlet passes in use; and a paint supply device penetrating the baffle plate and having a paint outlet downstream thereof whereby the paint exits the open end for painting an object to be painted.

* * * * *